US008866975B1

(12) United States Patent
Chen et al.

(10) Patent No.: US 8,866,975 B1
(45) Date of Patent: Oct. 21, 2014

(54) BACKWARDS-COMPATIBLE DELIVERY OF DIGITAL CINEMA CONTENT WITH HIGHER DYNAMIC RANGE AND RELATED PREPROCESSING AND CODING METHODS

(71) Applicant: Dolby Laboratories Licensing Corporation, San Francisco, CA (US)

(72) Inventors: Tao Chen, Palo Alto, CA (US); Samir N. Hulyalkar, Los Gatos, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 14/261,652

(22) Filed: Apr. 25, 2014

Related U.S. Application Data (60) Provisional application No. 61/818,843, filed on May 2, 2013.

(51) Int. Cl.
  *H04N 9/74* (2006.01)
  *G06F 11/00* (2006.01)
  *H04N 19/98* (2014.01)
  *H04N 19/44* (2014.01)

(52) U.S. Cl.
  CPC ............... *H04N 19/00981* (2013.01); *H04N 19/00533* (2013.01)
  USPC ............... 348/708; 348/678; 345/590

(58) Field of Classification Search
  USPC ........ 348/708, 441, 678; 375/240.01, 240.02, 375/240.26, 240.27; 709/232, 236, 228, 709/202; 345/589–591; 725/146–148
  See application file for complete search history.

(56) References Cited

U.S. PATENT DOCUMENTS

| | | | | |
|---|---|---|---|---|
| 6,654,504 | B2 * | 11/2003 | Lubin et al. | 382/254 |
| 8,285,378 | B1 * | 10/2012 | KenKnight et al. | 607/30 |
| 2003/0068097 | A1 * | 4/2003 | Wilson et al. | 382/276 |
| 2005/0111694 | A1 * | 5/2005 | Loce et al. | 382/100 |
| 2006/0007344 | A1 * | 1/2006 | Neufeld | 348/336 |
| 2006/0104533 | A1 * | 5/2006 | Daly et al. | 382/254 |
| 2009/0027558 | A1 * | 1/2009 | Mantiuk et al. | 348/673 |
| 2009/0116713 | A1 * | 5/2009 | Yan et al. | 382/128 |
| 2009/0273677 | A1 * | 11/2009 | Huynh-Thu et al. | 348/180 |
| 2011/0194618 | A1 | 8/2011 | Gish | |
| 2012/0050474 | A1 * | 3/2012 | Segall | 348/43 |
| 2012/0314944 | A1 * | 12/2012 | Ninan et al. | 382/166 |
| 2013/0027615 | A1 * | 1/2013 | Li | 348/571 |

(Continued)

FOREIGN PATENT DOCUMENTS

| | | |
|---|---|---|
| WO | 2010/105036 | 3/2010 |
| WO | 2012/027405 | 3/2012 |
| WO | 2013/090120 | 6/2013 |

*Primary Examiner* — Victor Kostak
(74) *Attorney, Agent, or Firm* — Steinfl & Bruno LLP (57) ABSTRACT

Methods and systems for image processing and delivery of higher dynamic range cinema content are disclosed. A digital cinema signal with a lower dynamic range is obtained from a digital cinema signal with a higher dynamic range, for example through mapping. The lower dynamic range digital cinema signal is encoded and decoded at the transmitting end. The decoded lower dynamic range digital cinema signal is normalized to produce a set of normalization parameters which enable the mapping process at the receiving end to produce a final image with higher dynamic range that is of a higher quality. Alternatively, the higher dynamic range digital cinema signal is also encoded and decoded at the transmitting end, to produce a set of normalization parameters which enable the mapping process at the receiving end to produce a final image with higher dynamic range that is of a higher quality.

20 Claims, 4 Drawing Sheets

(56) References Cited

U.S. PATENT DOCUMENTS

| | | | |
|---|---|---|---|
| 2013/0083838 A1* | 4/2013 | Touze et al. | 375/240.01 |
| 2013/0148029 A1 | 6/2013 | Gish | |
| 2013/0314495 A1* | 11/2013 | Chen et al. | 348/43 |
| 2014/0022460 A1* | 1/2014 | Li et al. | 348/708 |
| 2014/0044372 A1* | 2/2014 | Mertens | 382/248 |
| 2014/0079113 A1* | 3/2014 | Newton et al. | 375/240.01 |

* cited by examiner

BACKWARDS-COMPATIBLE DELIVERY OF DIGITAL CINEMA CONTENT WITH HIGHER DYNAMIC RANGE AND RELATED PREPROCESSING AND CODING METHODS

CROSS REFERENCE TO RELATED APPLICATIONS

This application claims benefit of priority to related, U.S. Provisional Patent Application No. 61/818,843 filed on May 2, 2013 entitled "Backwards-Compatible Delivery of Digital Cinema Content with Higher Dynamic Range and Related Preprocessing and Coding Methods". The present application may be related to PCT Application PCT/US2011/048861 entitled "Extending Image Dynamic Range", filed on Aug. 23, 2011, PCT Application PCT/US2010/026953 entitled "Layered Compression of High Dynamic Range", filed on Mar. 11, 2010, and PCT Application PCT/US2012/068275 entitled "Backwards-Compatible Delivery of Digital Cinema Content with Extended Range and Related Preprocessing and Coding Methods", filed on Dec. 6, 2012; wherein the disclosure of each of these references is incorporated herein by reference in its entirety.

TECHNICAL FIELD

The present disclosure relates to image processing for digital cinema as well as preprocessing and coding of digital image and/or video content. More particularly, embodiments of the present disclosure relate to single inventory delivery of higher dynamic range digital cinema content with backward compatibility to legacy playback devices for lower dynamic range content.

DESCRIPTION OF EXAMPLE EMBODIMENTS

As used herein, the term 'dynamic range' (DR) may relate to a capability of the human visual system (HVS) to perceive a range of intensity (e.g., luminance, luma) in an image, e.g., from darkest darks to brightest brights. In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the HVS. For example, well adapted humans with essentially normal vision (e.g., in one or more of a statistical, biometric or ophthalmological sense) have an intensity range that spans about 15 orders of magnitude. Adapted humans may perceive dim light sources of a few photons. Yet, these same humans may perceive the near painfully brilliant intensity of the noonday sun in desert, sea or snow (or even glance into the sun, however briefly to prevent damage). This span though is available to 'adapted' humans, e.g., those whose HVS has a time period in which to reset and adjust.

In contrast, the DR over which a human may simultaneously perceive an extensive breadth in intensity range may be somewhat truncated, in relation to HDR. As used herein, the term 'visual dynamic range' (VDR) may relate to the DR that is simultaneously perceivable by a HVS. As used herein, VDR may relate to a DR that spans 5-6 orders of magnitude, however it is not intended to be limited to any span of dynamic range, and VDR may be narrower or equal to HDR.

Until fairly recently, displays have had a significantly narrower DR than HDR or VDR. Television (TV) and computer monitor apparatus that use typical cathode ray tube (CRT), liquid crystal display (LCD) with constant fluorescent white back lighting or plasma screen technology may be constrained in their DR rendering capability to approximately three orders of magnitude. Such conventional displays thus typify a low dynamic range (LDR) or standard dynamic range (SDR), in relation to VDR and HDR. Digital cinema systems exhibit some of the same limitations as other display devices. In the present application, "visual dynamic range (VDR)" is intended to indicate any extended dynamic range, which is wider than LDR or SDR, and may be narrower or equal to HDR.

Advances in the underlying technology of digital cinema will allow future digital cinema systems to render image and video content with significant improvements in various quality characteristics over the same content, as rendered on today's digital cinema systems. For example, future digital cinema systems may be capable of a DR (e.g. VDR) that is higher than the SDR/LDR of conventional digital cinema systems as well as a larger color gamut than the color gamut of conventional digital cinema systems. The challenge is providing digital cinema content which may be displayed on conventional SDR, small color gamut systems at a standard quality level as well as more advanced VDR, wider color gamut systems at a correspondingly higher quality level.

Another challenge is to provide VDR cinema content within the bandwidth constraint of current technology, which typically requires compression of the signals. To reduce bandwidth and provide backward compatibility by being able to display both VDR and SDR signals, the signal is processed at the transmitting as well as the receiving ends, for example by using normalization and mapping processes. Herein and in the following, by "signal" a physical, electrical signal is intended, for example, a digital bitstream to represent an image or parameters related to image processing. Such signal (or image) processing can introduce a loss in image quality, one reason being the difference between the input signals used in the processing at the transmitting and receiving ends, respectively.

The present disclosure describes a method by which the same input is used for the signal (or image) processing at both the transmitting and receiving ends, thereby increasing the quality of the final cinema content delivered. Herein, by "transmission" a broad meaning is intended, for example direct transmission through any suitable physical channel (for example, radio waves, coaxial cables, or fiber optics), or delayed transmission, that is, storage in a suitable storage medium (for example, a dvd or flash drive) and physical delivery of the storage medium.

According to an example embodiment of the present disclosure, a method for processing digital images or video signals is provided, the method comprising: providing a first dynamic range digital image or video signal; processing the first dynamic range digital image or video signal to obtain a second dynamic range digital image or video signal having a dynamic range lower than the dynamic range of the first dynamic range image or video signal; encoding the second dynamic range digital image or video signal; decoding the encoded second dynamic range digital image or video signal; and normalizing the decoded second dynamic range digital image or video signal, generating a set of normalization parameters of the first dynamic range image or video signal with respect to the decoded second dynamic range image, thus obtaining a set of normalization parameters.

According to a further example embodiment of the present disclosure, a method for processing digital images or video signals is provided, the method comprising: providing a first dynamic range digital image or video signal; processing the first dynamic range digital image or video signal to obtain a second dynamic range digital image or video signal having a dynamic range lower than the dynamic range of the first dynamic range digital image or video signal; encoding the first and the second dynamic range digital image or video signal; decoding the encoded first and second dynamic range digital image or video signal; and normalizing the decoded second dynamic range digital image or video signal, generating a set of normalization parameters of the decoded first dynamic range image or video signal with respect to the decoded second dynamic range image, thus obtaining a set of normalization parameters.

According to a further example embodiment of the present disclosure, a device for processing digital images or video signals is provided, the device comprising: a processor configured to convert a first digital image or video signal into a second digital image or video signal having a dynamic range lower than the dynamic range of the first dynamic range image or video signal; an encoder configured to encode the second digital image or video signal; a decoder configured to decode the second digital image or video signal, obtaining a decoded second dynamic range digital image or video signal; and a normalization processor configured to normalize the decoded second dynamic range digital image or video signal, and to generate a set of normalization parameters of the first dynamic range image or video signal with respect to the decoded second dynamic range image.

According to a further example embodiment of the present disclosure, a device for processing digital images or video signals is provided, the device comprising: a processor configured to convert a first digital image or video signal into a second digital image or video signal having a dynamic range lower than the dynamic range of the first dynamic range image or video signal; an encoder configured to encode the first digital image or video signal; a decoder configured to decode the first digital image or video signal, obtaining a decoded first dynamic range digital image or video signal; an encoder configured to encode the second digital image or video signal; a decoder configured to decode the second digital image or video signal, obtaining a decoded second dynamic range digital image or video signal; and a normalization processor configured to normalize the decoded second dynamic range digital image or video signal, and to generate a set of normalization parameters of the decoded first dynamic range image or video signal with respect to the decoded second dynamic range image.

According to a further example embodiment of the present disclosure, a device for image processing is provided, the device comprising: a decoder configured to decode a first digital image or video signal of an encoded digital cinema bitstream, thus obtaining a decoded first dynamic range digital image or video signal; and a mapping processor configured to map the decoded first digital image or video signal to obtain a second digital image or video signal having a dynamic range higher than the dynamic range of the decoded first digital image or video signal, through a set of normalization parameters contained in the encoded digital cinema bitstream, wherein the set of normalization parameters are representative of a digital image or video signal with a dynamic range corresponding to the dynamic range of the second digital image or video signal, and a decoded digital image or video signal with a dynamic range corresponding to the dynamic range of the first digital image or video signal.

According to a further example embodiment of the present disclosure, a device for image processing is provided, the device comprising: a decoder configured to decode a first digital image or video signal of an encoded digital cinema bitstream, obtaining a decoded first dynamic range digital image or video signal; and a mapping processor configured to map the decoded first digital image or video signal to obtain a second digital image or video signal having a dynamic range higher than the dynamic range of the decoded first digital image or video signal, through a set of normalization parameters contained in the encoded digital cinema bitstream, wherein the set of normalization parameters are representative of a decoded digital image or video signal with a dynamic range corresponding to the dynamic range of the second digital image or video signal, and a decoded digital image or video signal with a dynamic range corresponding to the dynamic range of the first digital image or video signal.

As used herein, the term digital cinema refers to the projection of a theatrical motion picture through a digital cinema projection system. As used herein, the term digital cinema signal refers to a signal representing digital cinema information either describing a digital cinema image or video, or describing information related to image processing of said image or video.

As used herein, the terms digital image or video signal refer to digital content which may be, by way of example and not of limitation, live action, rendered CGI (computer-generated imagery), or from any source capable of producing a digital image or video signal.

According to several embodiments of the present disclosure, the normalization parameters and the SDR digital cinema image or video (whether encoded or not) are transmitted together, in what can be referred to a "single-inventory package", to indicate the fact that they are not transmitted separately. For example, if transmitted through a storage medium, they will be both present in the storage medium and delivered together. In one embodiment, the "single-inventory package" comprises the normalized parameters and the SDR digital signal (whether encoded or not), compressed and encoded with standard image processing techniques, such as those intended to provide error correction. If desired, the normalization parameters and the SDR digital signal may also be transmitted by multiplexing over an electronic transmission channel. Those skilled in the art will recognize that an electronic transmission channel may comprise different physical implementations, including, but not limited to, coaxial cables, ethernet cables, wireless connections, satellite transmission, cellular transmission channels and USB cables.

Figure 1:
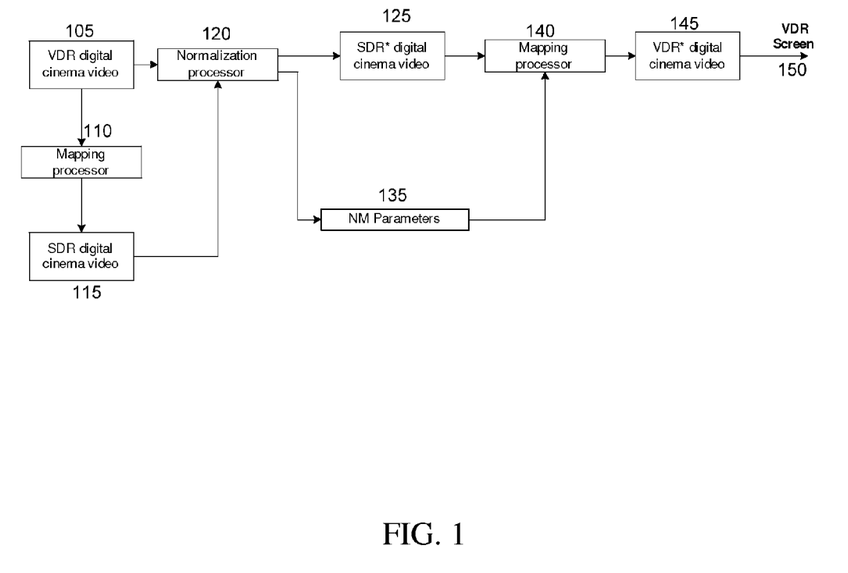
FIG. 1 depicts a schematic diagram of a cinema image or video architecture, wherein an original SDR signal is input to a normalization module at a transmitting end and a normalized SDR signal (denoted SDR*) is input to a mapping module at a receiving end.

FIG. 1 depicts a schematic diagram of a digital cinema delivery architecture.

A VDR digital cinema signal with a higher dynamic range (105) is sent to a mapping processor (110). The mapping processor outputs an SDR cinema signal (115) with a lower dynamic range than the input cinema signal. The SDR signal (115) with a lower dynamic range is normalized at a normalization processor (120) generating a set of normalization (NM) parameters (135) of the higher dynamic range image (105) with respect to the lower dynamic range image (115). In alternative embodiments, SDR signal (115) may be generated manually by a human operator (e.g., during color grading or post-processing) or in a combination of manual and automatic processing using mapping processor (110).

The result of the normalization process of the SDR signal is a normalized SDR digital cinema image or video signal, denoted SDR* (125). The SDR* digital cinema signal (125) is perceptually approximate to the SDR digital cinema signal (115). A set of normalization parameters (135), denoted NM parameters, are transmitted together with the SDR* cinema signal (125) to a playback device. An example embodiment of the normalization process (120) will be described in a later section of the present disclosure.

A mapping processor at a receiving end (140) uses the NM mapping parameters (135) and the SDR* cinema signal with a lower dynamic range (125) to reconstruct the VDR cinema image or video with a higher dynamic range (105). The VDR digital cinema signal obtained through mapping at the receiving end is denoted VDR* (145), and it is perceptually the same as the original VDR digital cinema signal (105). The VDR* signal (145) is then transmitted to a VDR screen (150) in order to display high dynamic range images or videos.

In the embodiment of FIG. 1, the SDR and VDR pictures are assumed to have the same picture resolution. If the SDR and VDR pictures have different resolutions, appropriate scaling can be introduced to handle the resolution change in the image processing.

In the embodiment of FIG. 1, normalization is used for mapping. However, those skilled in the art will recognize that different mapping solutions could be employed.

Figure 2:
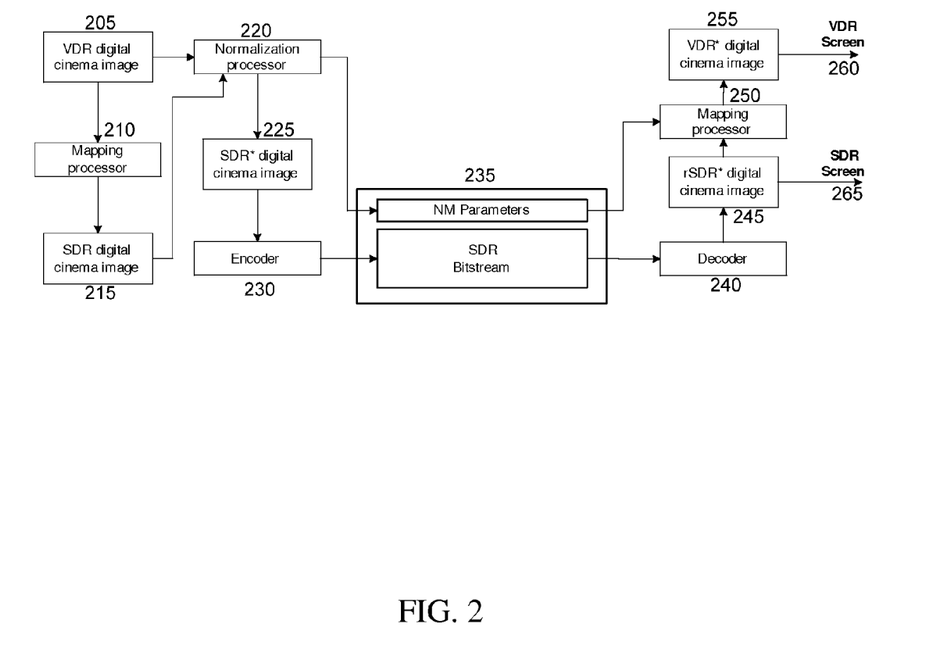
FIG. 2 depicts a schematic diagram of a cinema image or video architecture, wherein further encoding and decoding steps are added to the architecture of FIG. 1.

FIG. 2 depicts another embodiment, with a similar process to FIG. 1, but with an added compression step. A VDR cinema image or video with a higher dynamic range (205) is transmitted to a mapping processor (210), obtaining an SDR cinema image or video with a lower dynamic range (215).

A normalization processor (220) outputs a normalized SDR picture, denoted SDR* (225), which is transmitted to an encoder (230). The encoder can be of any form, such as, but not limited to, JPEG-2000, AVC, HEVC, etc. A resulting encoded bitstream as well as a set of normalization parameters NM are sent together (235) to a playback device at a receiving end.

A decoder (240) at the receiving end outputs a reconstructed (or decompressed) SDR signal, denoted rSDR* (245). The rSDR* signal (245) can be transmitted to an SDR screen (265), ensuring backward compatibility with devices which are limited to lower dynamic ranges. The rSDR* signal (245) is sent to a mapping processor (250), which uses the NM parameters of (235) to reconstruct a VDR* signal (255). The VDR* signal (255) is then sent to a VDR screen (260).

Upon review of the representation of FIG. 2, the person skilled in the art will note that the NM parameters of (235) are derived from the uncompressed SDR signal (215), while the mapping process (250) which utilizes the NM parameters of (235) at the receiving end is applied to the reconstructed SDR signal, or rSDR* (245). The difference between the SDR signal (215) and the rSDR* signal (245) can introduce artifacts in the cinema image or video, which can become visible in the final output image, VDR* (255). To reduce the possible artifacts in the final image caused by the difference between the SDR signal (215) and the rSDR* signal (245), the present disclosure describes methods and systems by which a reconstructed SDR signal is used as input not only to the mapping processor at the receiving end, but also to the mapping processor at the transmitting end.

Figure 3:
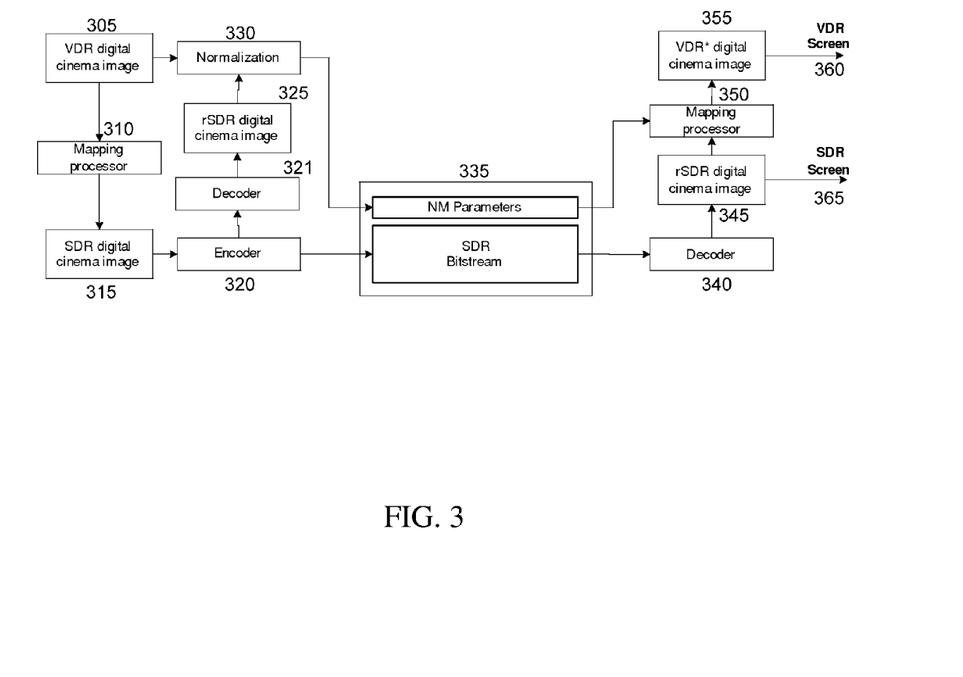
FIG. 3 depicts a schematic representation of an embodiment of the present disclosure to use the same decompressed SDR signal as input for normalization at the transmitting end and mapping at the receiving ends.

FIG. 3 shows one such embodiment, where a VDR cinema image or video at a higher dynamic range (305) is sent to a mapping processor (310) to obtain an SDR cinema image or video at a lower dynamic range (315). It should be noted that the mapping processor (310) may be substituted for a different processor which converts the VDR cinema signal (305) to the SDR cinema signal (315) by a different process different from mapping. For example, the processor substituting 310 may comprise a manual color grading process.

The SDR signal (315) is input to an encoder (320), whose output is then sent to a decoder (321), which generates a reconstructed SDR signal, denoted rSDR (325). The rSDR signal (325) is then input to a normalization processor (330), generating a set of normalization (NM) parameters of the higher dynamic range image (305) with respect to the decoded lower dynamic range image (325).

Similar to the previous embodiment, the set of NM parameters and an encoded SDR bitstream are transmitted together (335) to a receiving end. A decoder (340) at a playback device outputs an rSDR signal (345) which is then input to a mapping processor (350) together with the set of NM parameters of (335). The rSDR signal (345) can also be transmitted to an SDR screen (365), ensuring backward compatibility with devices which cannot display the higher dynamic range images. A mapping processor (350) produces a VDR* signal (255) which is then transmitted to a VDR screen (360) to display a high dynamic range cinema image.

Those skilled in the art will realize that different types of image processing or digital signal processing might be used to map between the higher dynamic range signal (e.g., VDR) and the lower dynamic range signal (e.g., SDR). Generally, any technique might be used that can map one pixel of an image from a domain H to a domain L. Depending on how many parameters are included (such as intensity, color, luminance, chromaticity, etc.) to describe an image, H and L will have a specific dimensionality. Since values in L are generally limited to a lower dynamic range than H, processing techniques aim at conserving a high perceived quality for L in spite of the possible adverse technical constraints; for example, clipping might occur when mapping from H to L, thereby losing some of the original image information. Examples of mapping include forward and inverse mapping techniques. Another example is tone mapping. Tone mapping and several other mapping techniques transform a VDR image to an SDR image, often by trying to minimize the difference between VDR and SDR. Those skilled in the art will know that information about the difference between VDR and SDR is contained into residuals. Residuals may be used, in some techniques, to reconstruct a VDR signal from an SDR signal, however that may not always be feasible, depending on what mapping technique is being used. Further, if residuals are very large it may indicate that a large amount of information is lost when converting from VDR to SDR—in other words, the mapping technique may not be very effective.

According to several embodiments of the present disclosure, mapping is implemented through a normalization process, in such a way as to be invertible. In other words, normalization can map an image from H to L and from L to H. In some embodiments of normalization, no residuals may be generated, or very small residuals may be generated. Those skilled in the art will understand the advantage of small, or zero, residuals when reconstructing a VDR image from a SDR image. Where traditional tone mapping is not invertible, normalization may be. Normalization may be implemented as an iterative process which, given an SDR and a VDR input of the same source, it outputs an SDR* output, a VDR* output, and a set of normalization parameters (NM), so that VDR*=f(SDR*, NM), and VDR* is perceptually the same as VDR.

In one embodiment, normalization may be implemented through the successive application of two transformations: a linear matrix transformation M and a non linear transformation N. For example, SDR*=MN VDR*. It is intended that the transformation should be applied in the order given, therefore if, in one example, the total transformation is written as MN, then N should be applied before M. By way of example and not of limitation, the non linear transformation N can be a six-segment, cubic spline, while matrix M can be a 3×3 matrix. The non linear transformation parameters can be indicated as $N_j$ and the linear matrix parameters as $M_{ij}$. In one embodiment, the parameters which describe an image in the H (VDR) or L (SDR) domains are indicated as $C_i^{VDR}$ and $C_i^{SDR}$ respectively. Therefore, part of a normalization process may be indicated as follows (where repeated indices imply summation and where the higher and lower dynamic range indicators are depicted as VDR and SDR by way of example):

$$C_i^{VDR} = i\text{-}th \text{ color component of } VDR \text{ image} \quad \text{Equation (1)}$$
$$C_i^{SDR} = i\text{-}th \text{ color component of } SDR \text{ image}$$
$$C_i^{SDR} = M_{i,j}N_j[C_j^{VDR}] = \sum_j M_{i,j}N_j[C_j^{VDR}]$$

When the N and M transformations are invertible, the VDR image or video can be recovered from the SDR image or video:

$$C_i^{VDR} = N_i^{-1}[M_{i,j}^{-1}C_j^{SDR}] = N_i^{-1}\left[\sum_j M_{i,j}^{-1}C_j^{SDR}\right] \quad \text{Equation (2)}$$

In some embodiments, SDR and VDR images or videos may be created in separate color grading passes. The SDR image may satisfy Equation (1) approximately, but not necessarily exactly. The function of the normalization process is to determine a modified version of the SDR image, i.e. SDR*. SDR* and the original VDR satisfy Equation (1) exactly and, furthermore, SDR* and SDR are typically indistinguishable visually. SDR and SDR* can be visually indistinguishable approximately 99% of the time, and in cases where there are visible differences, such differences can be visible only when the sequence is halted at a particular frame.

In one embodiment, the parameters for N and M may be estimated from the original image data. By way of example and not of limitation, such parameters can be determined iteratively using two routines "EstimateN" and "EstimateM", that estimate N or M while the other is fixed:
N=EstimateN[VDR,SDR,M]
M=EstimateM[VDR,SDR,N]
By way of example, as mentioned above, N can be modeled as a piecewise polynomial such as a piece-wise cubic spline with 5-6 segments, while M can be a 3×3 matrix.

The routine EstimateN inverts the matrix M and applies that to the SDR image or video. N is then the transformation between VDR and $M^{-1}$ SDR. In other words: $M^{-1}$ SDR=N VDR.

Similarly, the routine EstimateM applies the non linear transformation to VDR and then M is the transformation between N VDR and SDR. In other words: SDR=MN VDR. Thus, there are two estimation sequences, depending upon whether N or M is first estimated:
Sequence A:
Set $M^0$=I; (identity)
$N^0$=EstimateN[VDR,SDR,$M^0$];
$M^1$=EstimateM[VDR,SDR,$N^0$];
$N^1$=EstimateN[VDR,SDR,$M^1$];
$M^2$=EstimateM[VDR,SDR,$N^1$];
... iterate until a desired result is obtained, e.g. mathematical convergence.
Sequence B:
Set $N^0$=I; (identity)
$M^0$=EstimateM[VDR,SDR,$N^0$];
$N^1$=EstimateN[VDR,SDR,$M^0$];
$M^1$=EstimateM[VDR,SDR,$N^1$];
$N^2$=EstimateN[VDR,SDR,$M^1$];
... iterate until a desired result is obtained, e.g. mathematical convergence.

In other embodiments, other methods for determining N and M may be used, such as software optimization packages (e.g. MATLAB®).

In some embodiments, the degree of non linearity may be modified, for example to avoid clipping. As those skilled in the art will know, clipping can occur at both the low and high limits of intensity, and may be soft knee or high knee. In some embodiments, in order to make the transformation N invertible, the clipping may be softened.

Figure 4:
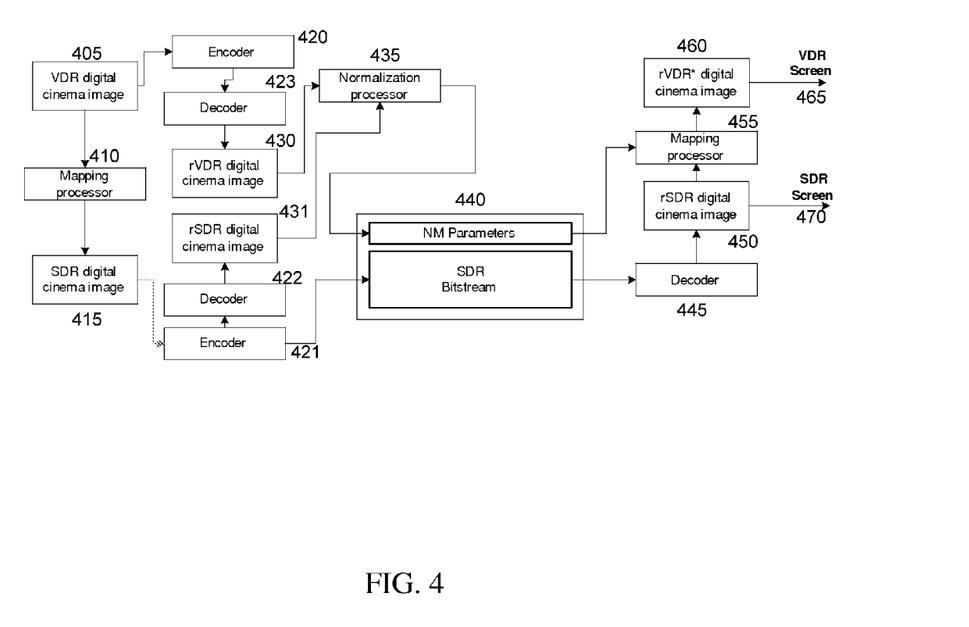
FIG. 4 depicts a schematic representation of another embodiment of the present disclosure, using the decompressed SDR and VDR signals as input for normalization at the transmitting end.

A further embodiment will now be described in FIG. 4, where the NM parameters of (335) are derived based on the uncompressed, original, VDR signal (305).

In particular, a VDR cinema image or video at a higher dynamic range (405) is sent to a mapping processor (410), which outputs an SDR cinema image or video at a lower dynamic range (415). It should be noted that the mapping processor (410) may be substituted for a different processor which converts the VDR cinema signal (405) to the SDR cinema signal (415) by a different process different from mapping. For example, the processor substituting 410 may comprise a manual color grading process. The VDR signal (405) is encoded (420), and subsequently decoded (423), and the SDR signal (415) is also encoded (421) and subsequently decoded (422), thus obtaining a reconstructed VDR signal, denoted rVDR (430), and a reconstructed SDR signal, denoted rSDR (431). The rSDR signal (431) is then normalized by a normalization processor (435), generating a set of normalization (NM) parameters of the decoded higher dynamic range image (430) with respect to the decoded lower dynamic range image (431). The set of NM parameters and the encoded SDR bitstream are transmitted together (440) to a receiving end.

The SDR bitstream of (440) is decoded (445) at the receiving end and a resulting decompressed signal, rSDR (450), is sent to a mapping processor (455) of a playback device together with the set of NM parameters of (440). The rSDR signal (450) can be sent to an SDR screen (470), ensuring backward compatibility with devices which are limited to lower dynamic range images. The mapping processor (455) outputs a rVDR* signal (460), which is then sent to a VDR screen (465) to display a high dynamic range cinema image or video.

The methods and systems described in the present disclosure may be implemented in hardware, software, firmware or any combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), or a field programmable logic array (FPGA)).

All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The examples set forth above are provided to give those of ordinary skill in the art a complete disclosure and description of how to make and use the embodiments of the backwards-compatible delivery of digital cinema content with extended range and related preprocessing and coding methods of the disclosure, and are not intended to limit the scope of what the inventors regard as their disclosure. Modifications of the above-described modes for carrying out the disclosure may be used by persons of skill in the video art, and are intended to be within the scope of the following claims.

A number of embodiments of the present disclosure have been described. Nevertheless, it will be understood that various modifications may be made without departing from the spirit and scope of the present disclosure. Accordingly, other embodiments are within the scope of the following claims.

The invention claimed is:

1. A method for processing digital images or video signals, the method comprising:
providing a first dynamic range digital image or video signal;
processing the first dynamic range digital image or video signal to obtain a second dynamic range digital image or video signal having a dynamic range lower than the dynamic range of the first dynamic range image or video signal;
encoding the second dynamic range digital image or video signal;
decoding the encoded second dynamic range digital image or video signal; and
normalizing the decoded second dynamic range digital image or video signal, generating a set of normalization parameters of the first dynamic range image or video signal with respect to the decoded second dynamic range image, thus obtaining a set of normalization parameters.

2. The method of claim 1, wherein the processing of the first dynamic range digital image or video signal comprises mapping.

3. The method of claim 1, further comprising transmitting the set of normalization parameters and the encoded second dynamic range digital image or video signal.

4. A method for processing digital images or video signals, the method comprising:
providing a first dynamic range digital image or video signal;
processing the first dynamic range digital image or video signal to obtain a second dynamic range digital image or video signal having a dynamic range lower than the dynamic range of the first dynamic range digital image or video signal;
encoding the first and the second dynamic range digital image or video signal;
decoding the encoded first and second dynamic range digital image or video signal; and
normalizing the decoded second dynamic range digital image or video signal, generating a set of normalization parameters of the decoded first dynamic range image or video signal with respect to the decoded second dynamic range image, thus obtaining a set of normalization parameters.

5. The method of claim 4, wherein the processing of the first dynamic range digital image or video signal comprises mapping.

6. The method of claim 4, further comprising transmitting the set of normalization parameters and the encoded second dynamic range digital image or video signal.

7. The method of claim 3, further comprising:
decoding the transmitted second dynamic range digital image or video signal; and
mapping the decoded second dynamic range digital image or video signal to obtain a reconstructed first dynamic range digital image or video signal, by using the transmitted set of normalization parameters.

8. The method of claim 1, where the normalization parameters are a set of values $N_j$ describing a non linear transformation, and a set of value $M_{ij}$ describing a linear matrix transformation.

9. The method of claim 8, wherein the non linear transformation and the linear matrix transformation are invertible.

10. The method of claim 8, wherein the non linear transformation and the linear matrix transformation are determined iteratively.

11. The method of claim 10, wherein an iteration step comprises:
setting initial values for $M_{ij}$;
estimating $N_j$ from $M_{ij}$, the first dynamic range digital image or video signal, and the second dynamic range digital image or video signal;
estimating $M_{ij}$ from $N_j$, the first dynamic range digital image or video signal, and the second dynamic range digital image or video signal; and
iterating the estimating steps for $N_j$ and $M_{ij}$ until a set condition is reached.

12. The method of claim 1, wherein the transmission step comprises storing the set of normalization parameters and the encoded second dynamic range digital image or video signal in a single package, and delivering the single package.

13. The method of claim 3, wherein the transmission step comprises sending the set of normalization parameters and the encoded second dynamic range digital image or video signal by multiplexing over an electronic transmission channel.

14. The method of claim 8, wherein the non linear transformation comprises a six segment cubic spline, and the linear transformation comprises a 3×3 matrix.

15. The method of claim 1, further comprising:
projecting the reconstructed first and/or second dynamic range digital image or video signal onto a respective screen capable of displaying the first and/or second dynamic range digital image or video signal.

16. A non-transitory computer-readable medium containing a set of instructions that causes an electronic device to perform the method recited in claim 1.

17. A device for processing digital images or video signals, the device comprising:
a processor configured to convert a first digital image or video signal into a second digital image or video signal having a dynamic range lower than the dynamic range of the first dynamic range image or video signal;
an encoder configured to encode the second digital image or video signal;
a decoder configured to decode the second digital image or video signal, obtaining a decoded second dynamic range digital image or video signal; and
a normalization processor configured to normalize the decoded second dynamic range digital image or video signal, and to generate a set of normalization parameters of the first dynamic range image or video signal with respect to the decoded second dynamic range image.

18. The device of claim 17, wherein the processor configured to convert the first digital image or video is a mapping processor.

19. The device of claim 17, further comprising a transmitter configured to transmit the set of normalization parameters and the encoded second dynamic range digital image or video signal.

20. A device for processing digital images or video signals, the device comprising:
a processor configured to convert a first digital image or video signal into a second digital image or video signal having a dynamic range lower than the dynamic range of the first dynamic range image or video signal;
an encoder configured to encode the first digital image or video signal;
a decoder configured to decode the first digital image or video signal, obtaining a decoded first dynamic range digital image or video signal;
an encoder configured to encode the second digital image or video signal;
a decoder configured to decode the second digital image or video signal, obtaining a decoded second dynamic range digital image or video signal; and
a normalization processor configured to normalize the decoded second dynamic range digital image or video signal, and to generate a set of normalization parameters of the decoded first dynamic range image or video signal with respect to the decoded second dynamic range image.

* * * * *